US009613277B2

(12) United States Patent
Appel et al.

(10) Patent No.: US 9,613,277 B2
(45) Date of Patent: *Apr. 4, 2017

(54) ROLE-BASED TRACKING AND SURVEILLANCE

(71) Applicant: International Business Machines Corporation, Armonk, NY (US)

(72) Inventors: Ana Paula Appel, Sao Paulo (BR); Maira Athanazio de Cerqueira Gatti, Rio de Janeiro (BR); Rogerio Abreu de Paula, Sao Paulo (BR); Claudio Santos Pinhanez, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 810 days.

This patent is subject to a terminal disclaimer.

(21) Appl. No.: 13/975,672

(22) Filed: Aug. 26, 2013

(65) Prior Publication Data

US 2016/0217345 A1 Jul. 28, 2016

(51) Int. Cl.

| G08B 13/00 | (2006.01) |
| G06K 9/00 | (2006.01) |
| G06K 9/62 | (2006.01) |
| G06K 9/52 | (2006.01) |
| G06T 7/00 | (2017.01) |
| G06T 7/20 | (2017.01) |
| G08B 13/196 | (2006.01) |

(52) U.S. Cl.
CPC ..... G06K 9/00771 (2013.01); G06K 9/00335 (2013.01); G06K 9/00342 (2013.01); G06K 9/52 (2013.01); G06K 9/6215 (2013.01); G06K 9/6267 (2013.01); G06K 9/6285 (2013.01); G06T 7/004 (2013.01); G06T 7/20 (2013.01); G08B 13/19608 (2013.01); G06T 2207/10048 (2013.01); G06T 2207/30241 (2013.01)

(58) Field of Classification Search
USPC .......................................... 340/541
See application file for complete search history.

(56) References Cited

U.S. PATENT DOCUMENTS

| 7,985,953 B2 | 7/2011 | Luterotti | |
| 2003/0025599 A1* | 2/2003 | Monroe | ........... G08B 13/19602 340/531 |

(Continued)

OTHER PUBLICATIONS

A. Girgensohn, F. Shipman, and L. Wilcox, "Determining Activity Patterns in Retail Spaces through Video Analysis," *Proceedings of the 16th ACM International Conference on Multimedia (MM '08)*. ACM, New York, NY, USA, pp. 889-892.

(Continued)

*Primary Examiner* — Brian Zimmerman
*Assistant Examiner* — Thomas McCormack
(74) *Attorney, Agent, or Firm* — Louis Percello

(57) ABSTRACT

A method for surveilling a monitored environment includes classifying an individual detected in the monitored environment according to a role fulfilled by the individual within the monitored environment, generating a trajectory that illustrates movements and locations of the individual within the monitored environment, and detecting when the trajectory indicates an event that is inconsistent with an expected pattern for the role.

18 Claims, 3 Drawing Sheets

(56) References Cited

U.S. PATENT DOCUMENTS

| | | | | |
|---|---|---|---|---|
| 2009/0072972 A1* | 3/2009 | Pederson | .......... | G07C 9/00158 340/541 |
| 2009/0219388 A1 | 9/2009 | Zisa | | |
| 2010/0289641 A1* | 11/2010 | Kates | .................. | G08B 13/183 340/541 |
| 2013/0321637 A1* | 12/2013 | Frank | ....................... | H04N 5/33 348/152 |
| 2014/0266669 A1* | 9/2014 | Fadell | .................. | G05B 19/042 340/501 |

OTHER PUBLICATIONS

J. S. Larson, E. Bradlow, and P. Fader, "An Exploratory Look at Supermarket Shopping Paths," *International Journal of Research and Marketing*, Apr. 2005. pp. 1-42.

I. Haritaoglu, D. Harwood, and L.S. Davis, "W4 Real-Time System for Detecting and Tracking People," International Conference on Face and Gesture Recognition, Apr. 14-16, 1998, Nara, Japan.

A. Hampapur, L. M. Brown, J. Connel, M. Lu, H. Merkl, S. Pankanti, A. W. Senior, C.-F. Shu, and Y.-L. Tian, "Multi-Scale Tracking for Smart Video Surveillance," *IEEE Transactions on Signal Processing*, vol. 22, No. 2, Mar. 2005. pp. 38-51.

E. G. Reiffel, A. Girgensohn, D. Kimber, T. Chen, and L. Qiong, "Geometric Tools for Multi-Camera Surveillance Systems," *First ACM/IEEE International Conference on Distributed Smart Cameras*, ICDSC 2007. pp. 132-139, Sep. 25-28, 2007.

Hu, et al. "A Survey on Visual Surveillance of Object Motion and Behavior," *IEEE Transactions on Systems, Man, and Cybernetics*, vol. 32, No. 3, pp. 344-352.

K. Ellingsen, "Salient Evident Detection in Video Surveillance Scenarios," *Master's Thesis at Department of Computer Science and Media Technology*, Gjovik University College, 2008.

* cited by examiner

ROLE-BASED TRACKING AND SURVEILLANCE

BACKGROUND OF THE INVENTION

The present invention relates generally to security and surveillance and relates more specifically to methods for classifying and tracking surveillance targets.

Many venues such as retail environments, factories, offices, transportation hubs, and the like employ surveillance systems in order to ensure customer safety, national security, and/or operational efficiency. Many conventional surveillance systems distribute large sets of surveillance devices (e.g., cameras, sensors, and the like) within a monitored area in order to detect illicit, unsafe, and/or unauthorized events. These devices generate surveillance data in the forms of streams and/or data points that are typically forwarded to a central location for review (e.g., by a human operator).

The computational cost of processing all of the surveillance data, however, can be prohibitive. For instance, if the surveillance system deploys a plurality of devices, all of which are continuously generating surveillance data, a potentially enormous amount of surveillance data will be generated. It may be difficult, if not impossible, for a human operator to efficiently review all of this data and therefore to respond in a timely manner to an event.

Moreover, events that may be normal for one type of person may be abnormal for another type of person. For instance, in a bank environment, it might be "normal" (i.e., likely not worthy of a security alert) for a teller or cashier to venture behind the counter, but "abnormal" (i.e., potentially worthy of a security alert) for a customer to do the same. Many conventional surveillance systems, however, have difficulty distinguishing between normal and abnormal events based on the type (or role) of the person involved in the events.

SUMMARY OF THE INVENTION

A method for surveilling a monitored environment includes classifying an individual detected in the monitored environment according to a role fulfilled by the individual within the monitored environment, generating a trajectory that illustrates movements and locations of the individual within the monitored environment, and detecting when the trajectory indicates an event that is inconsistent with an expected pattern for the role.

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In one embodiment, the invention is a method and apparatus for role-based tracking and surveillance. Embodiments of the invention automatically detect abnormal behavior of specific individual types or roles based on surveillance data generated by a plurality of surveillance devices. Within the context of the present invention, a "role" refers to the social and/or professional capacity (including the behaviors, rights, and obligations associated with that capacity) within which an individual finds him or herself in a monitored environment. For instance, in a retail environment, an individual may fulfill the role of "customer," "cashier," "manager," "security personnel," or the like. Abnormal events can be automatically detected by comparing a detected individual's observed actions with historical patterns (e.g., predetermined "normal" or allowed conduct and activities) for the role according to which the individual is classified. The disclosed system supports even large-scale surveillance systems because it does not require or rely on the identification of the detected individual or on pre-defined behavior types. Although the invention is described within the exemplary context of human tracking and surveillance, the same techniques described herein may be used to track and monitor non-human surveillance targets (e.g., animals, vehicles, etc.). Moreover, although the invention is described within the exemplary context of security applications, the disclosed techniques could also be implemented to detect non-security related events.

Figure 1:
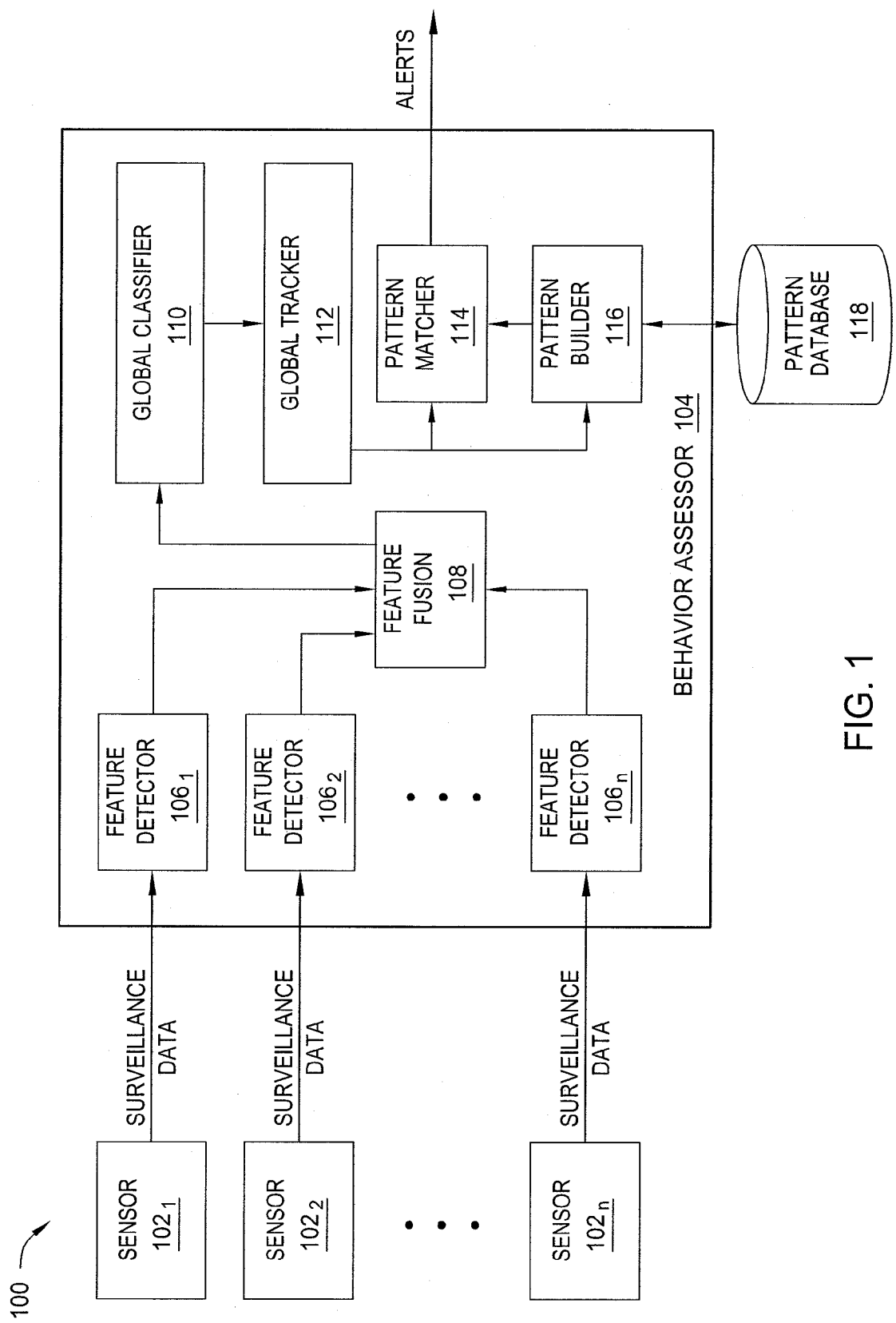
FIG. 1 is a block diagram illustrating one embodiment of a system for role-based tracking and surveillance, according to the present invention.

FIG. 1 is a block diagram illustrating one embodiment of a system 100 for role-based tracking and surveillance, according to the present invention. In one embodiment, the system 100 includes two main components: plurality of sensors $102_1$-$102_n$ (hereinafter collectively referred to as "sensors 102") and a behavior assessor 104. The sensors 102 and the behavior assessor 104 cooperate to automatically classify individuals according to role and to detect behaviors that deviate from behavior expected of the roles.

The sensors 102 provide surveillance data for processing by various components of the behavior assessor 104. These sensors 102 may include one or more of: imaging sensors (e.g., still cameras, video cameras, thermographic cameras, or the like), biometric sensors (e.g., fingerprint sensors, ocular sensors, voice sensors, or the like), or electronic scanners (e.g., for scanning machine-readable tags or labels, such as radio frequency identification tags, bar codes, or the like). The sensors 102 collect surveillance data from various physical locations within a monitored environment. For instance, any one or more of the sensors 102 may be positioned to collect surveillance data at the entrances and exits of the monitored environment, from specific locations within the monitored environment (e.g., restricted access or high-traffic areas), or from any other location.

The behavior assessor 104 receives surveillance data from the sensors 102 and generates an alert when analysis of the surveillance data indicates the occurrence of an abnormal event. To this end, the behavior assessor 104 comprises at least: a plurality of feature detectors $106_1$-$106_n$ (hereinafter collectively referred to as "feature detectors 106"), a feature fusion engine 108, a global classifier 110, a global tracker 112, a pattern matcher 114, and a pattern builder 116. Any of the behavior assessor components 106-116 may comprise a processor configured to perform specific functions related to role-based tracking and surveillance. In addition, the behavior assessor 104 is in communication with a pattern database 118. Although the pattern database 118 illustrated in FIG. 1 is depicted as remote storage (i.e., separate from the behavior assessor 104), in alternative embodiments, the pattern database may be integrated with the behavior assessor 104 as local storage.

The feature detectors 106 receive raw surveillance data from the sensors 102 and extract features from the surveillance data. The features comprise characteristics depicted in the surveillance data that may aid in identifying the role of and/or tracking an individual present in the monitored environment. For instance, a feature detector 106 that receives thermographic images from a thermographic camera may extract a thermal marker or pattern from the thermographic images that indicates a particular role. Although FIG. 1 illustrates a one-to-one correspondence between sensors 102 and feature detectors 106, the system 100 is not so limited. For instance, a given feature detector 106 might receive surveillance data from a plurality of sensors 102 of the same type (e.g., a plurality of video cameras). Alternatively, a given sensor 102 may provide surveillance data to a plurality of feature detectors 106 that each implement different algorithms for feature extraction.

The feature fusion engine 108 receives the features extracted by the feature detectors 106 and correlates the features into groups that pertain to common individuals or roles. For instance, the feature fusion engine 108 may determine that a thermographic marker extracted by a first feature detector 106, a facial image extracted by a second feature detector 106, and a radio frequency identification tag extracted by a third feature detector 106 all depict the same person or role. Having a plurality of extracted features related to a given individual may increase the probability of correctly identifying the individual's role and improve the ability of the system 100 to track the individual throughout the monitored environment.

The global classifier 110 receives the groups of features generated by the feature fusion engine 108 and assigns a class to each of the groups of features. In one embodiment, the class assigned to a group of features identifies a characteristic of the individual to whom the group of features pertains. In one particular embodiment, the global classifier 110 classifies groups of features based on the roles of the associated individuals in the monitored environment. For example, individuals in a retail environment may fulfill a set of roles including "customer," "cashier," "manager," "security personnel," or the like; thus, the groups of features extracted from the retail environment may be classified according to these roles. The global classifier 110 identifies the role/class that is best implied by a given group of features.

The global tracker 112 receives the classified groups of features and uses them to track the associated individuals or roles throughout the monitored environment. Thus, the global tracker 112 associates a trajectory with each group of features that records the movements and locations of the associated individual or role within the monitored environment.

The pattern matcher 114 receives the trajectories and associated classes from the global tracker 112 and uses this information to determine when an event has occurred that represents a potential abnormality (e.g., a breach of security). In one embodiment, the pattern matcher 114 detects such events by comparing a given trajectory to an historical behavior pattern for the class associated with the trajectory. For instance, if the pattern matcher 114 receives a trajectory associated with the class of "customer," the pattern matcher 114 would compare the trajectory to an historical behavior pattern for the class of "customer." In one embodiment, the historical behavior patterns for various classes are stored in the pattern database 118.

The pattern builder 116 also receives the trajectories and associated classes from the global tracker 112, but uses this information to learn and build behavior patterns associated with the various classes indicated by the groups of features. The learned patterns are stored in the pattern database 118 for use by the pattern matcher 114 as described above.

Although the system 100 is illustrated as comprising a plurality of individual components that perform discrete functions, it will be appreciated that any two or more of the illustrated components may be combined in a single component that performs multiple functions. Additionally, although the system 100 is illustrated as a contained system, it will be appreciated that the various components of the system 100 may be physically distributed throughout the monitored environment (although still contained within the physical boundaries of the monitored environment), and some of the components may even be located off-site (i.e., outside the physical boundaries of the monitored environment). To this end, the various components of the system 100 may include a combination of wireless and physically connected devices.

Figure 2:
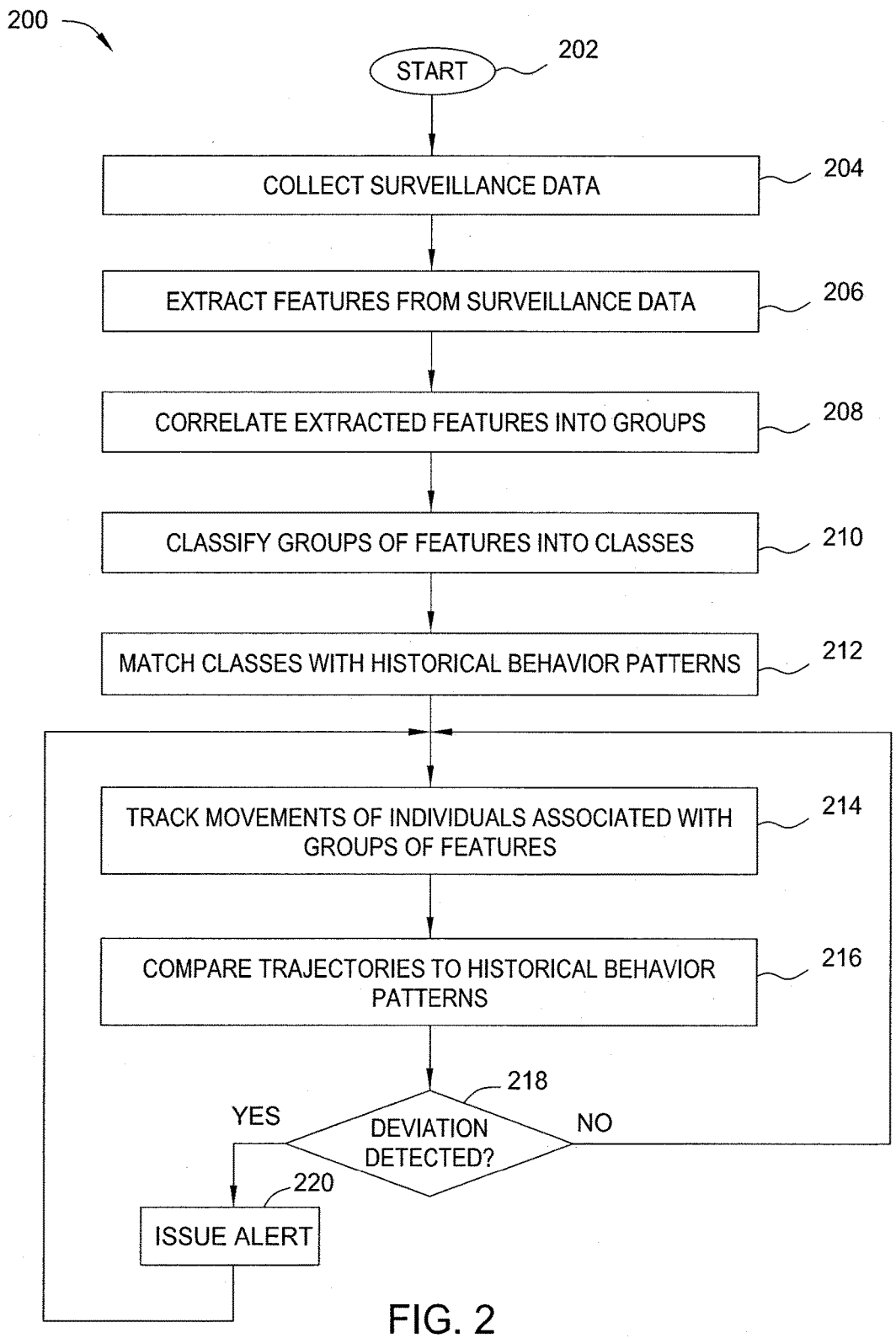
FIG. 2 is a flow diagram illustrating one embodiment of a method for performing role-based tracking and surveillance, according to the present invention.

FIG. 2 is a flow diagram illustrating one embodiment of a method 200 for performing role-based tracking and surveillance, according to the present invention. The method 200 may be performed, for example, by the system 100 illustrated in FIG. 1. As such, reference is made in the discussion of the method 200 to various elements depicted in FIG. 1. However, it will be appreciated that the method 200 may also be performed by systems having alternate configurations.

The method 200 begins at step 202 and proceeds to step 204, where the sensors 102 collect surveillance data from a monitored environment. For instance, the surveillance data may include substantially real-time data collected by one or more of the sensors 102 that allows the system 100 to uniquely identify individuals within the monitored environment. Within the context of the present invention, the ability to "uniquely identify" and individual does not necessarily imply that the individual's identity (e.g., name) is recognized or revealed. Rather, embodiments of the present invention associate sets of features with a common individual as a means of recognizing the individual (and distinguishing the individual from others) when he or she moves to different locations within a monitored environment. As discussed above, the surveillance data may include images, biometric data, electronic data, or other types of information collected from the monitored environment. For instance, the images may include still and/or video images, which would allow the system 100 to identify and track individuals by their appearances. The biometric data may include fingerprints, ocular features, gait, or the like, which would allow the system 100 to identify and track individuals by their individual features. The electronic data may include bar codes, radio frequency identification tags, or the like, which would allow the system 100 to identify and track individuals by electronic and/or electromagnetic signals.

In step 206, the feature detectors 106 detect and extract features from the surveillance data collected in step 204. In one embodiment, the extracted features include information that helps to identify the roles of individuals present in the monitored environment distinguish among individuals present in the monitored environment. For instance, features extracted from a still image of an individual might include a uniform or a badge that indicates the individual's role. Features extracted from a radio frequency identification tag attached to an individual might include an access authorization or license. Features extracted from a thermographic image might include thermal markers (e.g., patterns that may be recognized by a pattern recognition algorithm) embedded in an individual's clothing. Because thermal markers are substantially invisible to the human eye, they may be especially useful for marking undercover security personnel, who may need to access restricted locations without explicitly broadcasting their roles. Thermal markers are also less sensitive to environmental conditions that would otherwise affect tracking using conventional visual markers (e.g., low-light conditions).

In step 208, the feature fusion engine 108 correlates the extracted features into groups. A group of features created by the feature fusion engine 108 includes features that are believed to identify a common individual (e.g., a thermographic marker and a facial image associated with the same person).

In step 210, the global classifier 110 attempts to classify the groups of features. In one particular embodiment, the global classifier 110 attempts to recognize the role associated with each group of features. For example, in a retail environment, a given group of features might indicate that the individual from whom the features come is a customer, a cashier, a manager, a security guard, or the like. In a sport event environment, a given group of features might indicate that the individual is a player, a coach, a spectator, a referee/umpire, a security guard, a vendor, or the like. In some cases, the global classifier 110 may not be able to classify a given group of features. In such an event, the global classifier 110 may wait to receive additional information or features from the feature fusion engine 108, in case the additional information helps to resolve the classification.

In step 212, the pattern matcher 114 matches the classes to historical behavior patterns associated with the classes. The historical behavior pattern for a given class represents movements and activities that are considered "normal" (i.e., likely not worthy of an alert) for the role associated with the given class. In one embodiment, the historical behavior patterns are retrieved from the pattern database 118.

In step 214, the global tracker 112 tracks the movements of the individuals associated with the groups of features throughout the monitored environment. This creates a series of trajectories that illustrate the individuals' real-time movements and behaviors in the monitored environment. In one embodiment, the individuals are tracked only for as long as they remain within the monitored environment; once an individual exits the monitored environment (which may be indicated by the global tracker's inability to detect the individual's presence), the global tracker 112 ceases to create a trajectory for the individual.

In step 216, the pattern matcher 114 compares the trajectories to the historical behavior patterns for the corresponding classes. In particular, the pattern matcher 114 observes the trajectories in order to confirm that the trajectories are substantially consistent with the expected historical behavior patterns to which they are matched.

In step 218, the pattern matcher 114 determines whether any of the trajectories have deviated from the historical behavior patterns to which they are matched. In one embodiment, deviations are detected by computing a measure of similarity or dissimilarity between the trajectories and the associated historical behavior patterns. In one embodiment, the pattern matcher 114 is tolerant to a threshold deviation; however, any deviation beyond the threshold is considered abnormal.

If the pattern matcher 114 concludes in step 218 that a trajectory has deviated from an historical behavior pattern to which it is matched, then the pattern matcher 114 issues an alert in step 220. In one embodiment, issuing the alert includes sending a message including details of the deviation (e.g., the class of the individual associated with the deviation, the action that deviated from the historical behavior pattern, the location at which the deviation occurred, etc.) to a central control location for review. In another or further embodiment, issuing the alert includes activating an alarm (e.g., an audible and/or visible alarm) or taking other cautionary or corrective measures (e.g., activating locks in restricted areas). Once an alert has been issued, the method 200 returns to step 214. The global tracker 112 and the pattern matcher 114 continue to track individuals and to compare their movements to historical behavior patterns until the individuals exit the monitored environment.

If the pattern matcher 114 concludes in step 218 that no trajectory has deviated from the historical behavior pattern to which it is matched, then the method 200 returns to step 214. The global tracker 112 and the pattern matcher 114 continue to track individuals and to compare their movements to historical behavior patterns until the individuals exit the monitored environment.

As discussed above, role-based tracking and surveillance according to the present invention relies in part on a database of historical behavior patterns for the various roles with which an individual in a monitored environment may be associated (e.g., pattern database 118). Although behavior patterns may be pre-programmed into the system 100, the system 100 is also capable of learning new roles and associated behavior patterns. In addition, the system 100 may learn new features and/or behavior patterns associated with previously established roles. Ongoing learning allows the system 100 to perform more accurate tracking and surveillance by remaining up-to-date and by building a customized knowledge base for the monitored environment in which the system 100 is employed.

Although the present invention is largely described within the context of the access control, it is noted that the methods disclosed herein may be advantageously deployed in other contexts. For instance, other embodiments, the present invention may be used to determine whether actions taken by a particular individual are consistent with his or her role. As a specific example, embodiments of the present invention may be employed to ensure security and adherence to safety protocols by monitoring employees in a workplace (e.g., a factory or laboratory).

In further embodiments, the ability to detect different behavior patterns may support the provision of differentiated or customized services. For instance, different sub-types of customers may be detected in a retail environment, and customized goods or services could be offered to the customers based on sub-type.

Figure 3:
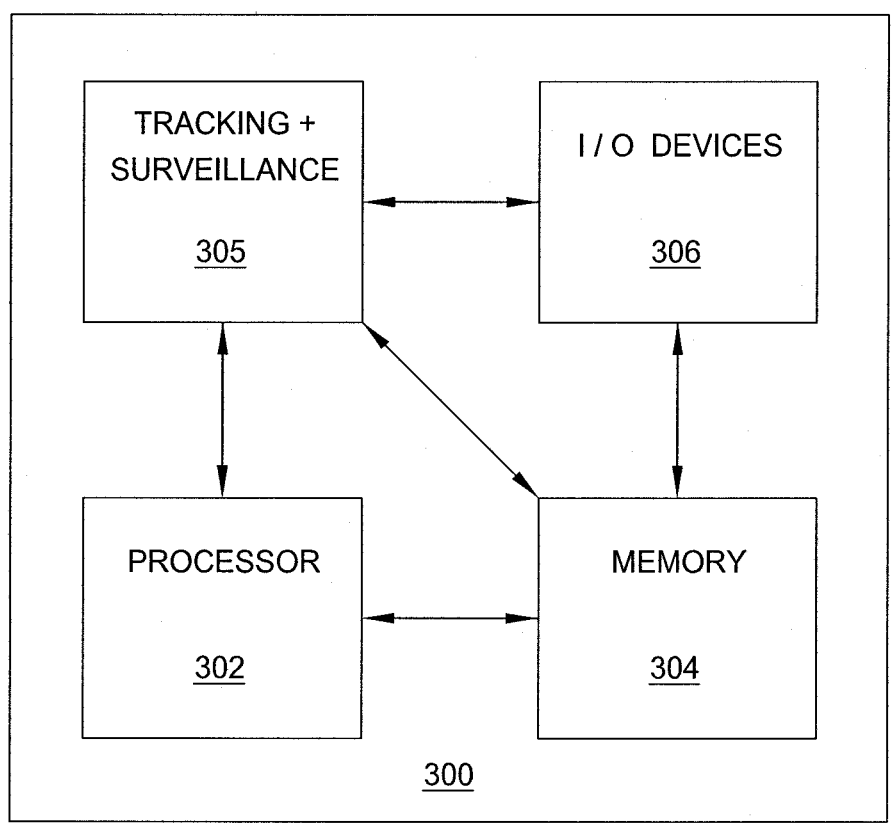
FIG. 3 is a high-level block diagram of the role-based tracking and surveillance method that is implemented using a general purpose computing device.

FIG. 3 is a high-level block diagram of the role-based tracking and surveillance method that is implemented using a general purpose computing device 300. In one embodiment, a general purpose computing device 300 comprises a processor 302, a memory 304, a tracking and surveillance module 305 and various input/output (I/O) devices 306 such as a display, a keyboard, a mouse, a stylus, a wireless network access card, an Ethernet interface, and the like. In one embodiment, at least one I/O device is a storage device (e.g., a disk drive, an optical disk drive, a floppy disk drive).

It should be understood that the tracking and surveillance module 305 can be implemented as a physical device or subsystem that is coupled to a processor through a communication channel.

Alternatively, the tracking and surveillance module 305 can be represented by one or more software applications (or even a combination of software and hardware, e.g., using Application Specific Integrated Circuits (ASIC)), where the software is loaded from a storage medium (e.g., I/O devices 306) and operated by the processor 302 in the memory 304 of the general purpose computing device 300. Thus, in one embodiment, the tracking and surveillance module 305 for role-based tracking and surveillance, as described herein with reference to the preceding figures, can be stored on a computer readable storage medium or device (i.e., a tangible or physical article such as RAM, a magnetic or optical drive or diskette, and the like, rather than a propagating signal).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying figures that recite a determining operation or involve a decision, do not necessarily require that both branches of the determining operation be practiced. In other words, one of the branches of the determining operation can be deemed as an optional step.

While the foregoing is directed to embodiments of the present invention, other and further embodiments of the invention may be devised without departing from the basic scope thereof. Various embodiments presented herein, or portions thereof, may be combined to create further embodiments. Furthermore, terms such as top, side, bottom, front, back, and the like are relative or positional terms and are used with respect to the exemplary embodiments illustrated in the figures, and as such these terms may be interchangeable.

What is claimed is:

1. A method for surveilling a monitored environment, the method comprising:
    obtaining an electronic signal from a sensor positioned in the monitored environment;
    extracting data about an individual present in the monitored environment from the electronic signal;
    classifying the individual according to a role fulfilled by the individual within the monitored environment, using the data extracted from the electronic signal, wherein the classifying is performed without recognizing an identity of the individual;
    determining an expected pattern of behavior associated with the role in the monitored environment;
    generating a trajectory that illustrates movements and locations of the individual within the monitored environment;
    detecting when the trajectory indicates an event that is inconsistent with the expected pattern of behavior, wherein the detecting is performed subsequent to the classifying; and
    activating a tangible responsive measure in response to the detecting.

2. The method of claim 1, wherein the classifying comprises:
    correlating the data extracted from the electronic signal with surveillance data collected from a plurality of sensors to produce a group of features associated with the individual; and
    identifying the role as implied by the group of features.

3. The method of claim 2, wherein the plurality of sensors is positioned to collect the surveillance data from the monitored environment.

4. The method of claim 3, wherein the surveillance data includes an image of the individual.

5. The method of claim 4, wherein the image is a thermographic image.

6. The method of claim 5, wherein the thermographic image depicts a thermal marker.

7. The method of claim 3, wherein the surveillance data includes biometric data.

8. The method of claim 1, wherein the data extracted from the electronic signal includes machine-readable data.

9. The method of claim 1, wherein the expected pattern of behavior is retrieved from a database storing a plurality of behavior patterns associated with various roles within the monitored environment.

10. The method of claim 1, wherein the expected pattern of behavior indicates historical behavior associated with the role.

11. The method of claim 1, wherein the detecting comprises:
    computing a measure of similarity between the trajectory and the expected pattern of behavior, wherein the event deviates from the measure of similarity beyond a threshold.

12. The method of claim 1, wherein the detecting comprises:
    computing a measure of dissimilarity between the trajectory and the expected pattern of behavior, wherein the event deviates from the measure of similarity beyond a threshold.

13. The method of claim 1, wherein the tangible responsive measure comprises a message sent to a central control location.

14. The method of claim 13, wherein the message includes detailed data pertaining to the event.

15. The method of claim 1, wherein the tangible responsive measure comprises an activation of an audible alarm.

16. The method of claim 1, wherein the tangible responsive measure comprises an implementation of a cautionary measure.

17. The method of claim 1, wherein the tangible responsive measure comprises an activation of a visible alarm.

18. The method of claim 16, wherein the cautionary measure comprises activating a lock in a restricted area of the monitored environment.

* * * * *